(12) United States Patent
Abraham et al.

(10) Patent No.: US 7,562,816 B2
(45) Date of Patent: Jul. 21, 2009

(54) INTEGRATING TOUCH, TASTE, AND/OR SCENT WITH A VISUAL INTERFACE OF AN AUTOMATED SYSTEM FOR AN ENHANCED USER EXPERIENCE

(75) Inventors: Subil M. Abraham, Plano, TX (US); Vinod A. Bijlani, Aundh, IN (US); Mathews Thomas, Flower Mound, TX (US)

(73) Assignee: International Business Machines Corporation, Armonk, NY (US)

( * ) Notice: Subject to any disclaimer, the term of this patent is extended or adjusted under 35 U.S.C. 154(b) by 249 days.

(21) Appl. No.: 11/611,973

(22) Filed: Dec. 18, 2006

(65) Prior Publication Data

US 2008/0147515 A1 Jun. 19, 2008

(51) Int. Cl.
  G06Q 30/00 (2006.01)
  G06Q 90/00 (2006.01)
  G06F 17/30 (2006.01)
  G06F 19/00 (2006.01)
  G06F 7/08 (2006.01)
  G06K 15/00 (2006.01)
(52) U.S. Cl. ............... 235/383; 235/378; 235/381; 235/385
(58) Field of Classification Search .......... 705/26, 705/27; 235/383, 378, 381, 385
See application file for complete search history.

(56) References Cited

U.S. PATENT DOCUMENTS

| | | | | |
|---|---|---|---|---|
| 5,482,139 A * | 1/1996 | Rivalto | ............... | 186/36 |
| 5,590,062 A * | 12/1996 | Nagamitsu et al. | ............... | 703/6 |
| 5,845,261 A * | 12/1998 | McAbian | ............... | 705/26 |
| 6,021,362 A * | 2/2000 | Maggard et al. | ............... | 700/234 |
| 6,053,738 A * | 4/2000 | Ivey, Jr. | ............... | 434/127 |
| 6,058,367 A * | 5/2000 | Sutcliffe et al. | ............... | 705/1 |
| 6,169,595 B1 * | 1/2001 | Manne | ............... | 352/85 |
| 6,231,032 B1 * | 5/2001 | Ivey, Jr. | ............... | 261/26 |
| 6,334,127 B1 | 12/2001 | Bieganski et al. | | |
| 7,040,535 B2 * | 5/2006 | Sato et al. | ............... | 235/381 |
| 7,269,573 B1 * | 9/2007 | Bunn et al. | ............... | 705/27 |
| 2001/0051905 A1 * | 12/2001 | Lucas | ............... | 705/29 |
| 2002/0029173 A1 * | 3/2002 | Goldstein | ............... | 705/26 |
| 2002/0047020 A1 * | 4/2002 | Dudek | ............... | 221/9 |
| 2002/0068010 A1 * | 6/2002 | Laudamiel-Pellet et al. | .... | 422/5 |
| 2002/0091991 A1 * | 7/2002 | Castro | ............... | 717/106 |
| 2002/0103692 A1 | 8/2002 | Rosenberg et al. | | |
| 2002/0175175 A1 * | 11/2002 | Oshinsky et al. | ............... | 221/1 |
| 2003/0004610 A1 * | 1/2003 | Niemeyer et al. | ............... | 700/245 |
| 2003/0024212 A1 * | 2/2003 | Schaefer et al. | ............... | 53/410 |

(Continued)

*Primary Examiner*—Daniel Walsh
(74) *Attorney, Agent, or Firm*—Patents on Demand, PA; Brian K. Buchheit

(57) ABSTRACT

The present invention includes a method for providing a robust user experience with an automated system that includes sensory output, such as touch, taste, and/or smell as well as visual output. The automated system can be an e-commerce or automated shopping system. The method can visually present a user selected item for consumer purchase within a graphical user interface (GUI). Sensory output can be produced that simulates how the selected item smells, feels, and/or tastes can be provided. A user can then made a selection in the GUI to modify an aspect of the selected item and/or an environmental condition for an environment of the selected item. The visual presentation of the object and the sensory output for the item can be adjusted in accordance with the user specified modification.

20 Claims, 6 Drawing Sheets

U.S. PATENT DOCUMENTS

| | | | |
|---|---|---|---|
| 2003/0064801 A1* | 4/2003 | Breckner et al. | 463/30 |
| 2003/0105682 A1 | 6/2003 | Dicker et al. | |
| 2003/0115117 A1* | 6/2003 | Sugimoto | 705/27 |
| 2003/0129757 A1* | 7/2003 | Rohleder | 436/55 |
| 2003/0195816 A1* | 10/2003 | Dziaba et al. | 705/26 |
| 2003/0236710 A1 | 12/2003 | Tong et al. | |
| 2004/0077424 A1* | 4/2004 | Murphy et al. | 472/137 |
| 2004/0180226 A1* | 9/2004 | Chatterjee et al. | 428/458 |
| 2004/0210819 A1* | 10/2004 | Alonso | 715/500 |
| 2004/0238626 A1* | 12/2004 | Salzmann | 235/381 |
| 2004/0243455 A1* | 12/2004 | Smith | 705/7 |
| 2004/0243471 A1* | 12/2004 | Salmen et al. | 705/15 |
| 2005/0125309 A1 | 6/2005 | Song | |
| 2005/0150948 A1* | 7/2005 | Sato et al. | 235/381 |
| 2005/0182678 A1* | 8/2005 | Walker et al. | 705/14 |
| 2005/0251440 A1* | 11/2005 | Bednarek | 705/10 |
| 2005/0266102 A1* | 12/2005 | Bahash | 424/725 |
| 2006/0026048 A1 | 2/2006 | Kolawa et al. | |
| 2006/0027597 A1* | 2/2006 | Chow et al. | 222/129.1 |
| 2006/0041478 A1 | 2/2006 | Zheng | |
| 2006/0074742 A1* | 4/2006 | Santandrea | 705/10 |
| 2006/0095864 A1* | 5/2006 | Mock et al. | 715/810 |
| 2006/0109734 A1 | 5/2006 | Fukuda et al. | |
| 2006/0265280 A1* | 11/2006 | Nakada et al. | 705/14 |
| 2007/0027576 A1* | 2/2007 | Juds et al. | 700/232 |
| 2007/0250406 A1* | 10/2007 | Mason et al. | 705/27 |
| 2008/0006692 A1* | 1/2008 | Gillespie et al. | 235/381 |
| 2008/0010167 A1* | 1/2008 | Bunn et al. | 705/26 |
| 2008/0117201 A1* | 5/2008 | Martinez et al. | 345/418 |
| 2008/0147515 A1* | 6/2008 | Abraham et al. | 705/27 |

* cited by examiner

INTEGRATING TOUCH, TASTE, AND/OR SCENT WITH A VISUAL INTERFACE OF AN AUTOMATED SYSTEM FOR AN ENHANCED USER EXPERIENCE

BACKGROUND

1. Field of the Invention

The present invention relates to sensory computing and e-commerce and, more particularly, to integrating touch, taste, and/or scent with a visual interface of an automated system for an enhanced user experience.

2. Description of the Related Art

Consumers are increasingly taking advantage of e-commerce marketing channels over store front commerce channels due to many inherent advantages. Unlike store front channels with limited and costly inventory space, e-commerce channels can have a virtually unlimited inventory, which even includes items that are purchased by an e-retailer from a wholesaler after a consumer purchase. E-commerce channels can result in a more efficient and competitive market for consumers than other channels, which permits consumers to receive better deals on items than can typically be had through storefront channels. Another major advantage of e-commerce channels relates to purchasing convenience. Many consumers likes the convenience of being able to rapidly purchase items from multiple distributors and having the items shipped to destinations of choice without having to fight crowds, without having to package items themselves, and without having to search multiple storefronts to find one that currently has stocked an in-demand item or set of items.

A relatively new, yet increasingly implemented e-commerce shopping mechanism relates to utilizing a set of known consumer characteristics, habits, and preferences to suggest products of interest to the consumers. One variant of this technique is a direct marketing mechanism incorporated within many several Web sites, such as GOOGLE and YAHOO, that present targeted product advertisements to consumers based upon consumer search requests. Another technique variant is guided shopping. In guided shopping, consumers are prompted with questions related to shopping behavior, interests, occupation, and consumer attributes. This information can be refined using generalized consumer metrics, marketing trends, consumer history, and other data driven factors. At present, guided shopping techniques can automatically generate a set of suggestions that have a relatively high purchasing success rate and that result in a relatively high consumer satisfaction rating.

At present, e-commerce marketing channels remain inferior to storefront channels for many items that are targeted to a sense of touch, taste, or smell. A consumer may purchase a perfume using an online supplier, it that is a perfume which the consumer is intimately familiar with and often purchases. It is unlikely, however, that a consumer will purchase a presently unknown perfume from the online supplier, since the purchase would be made relatively blindly. Instead, a consumer would more likely be interested in a new perfume after being exposed to it within a department store, assuming the scent is pleasant to the consumer. Similar problems exist for products with important attributes dependent upon tactile aspects (i.e., relating to a sense of touch) and/or to products that are edible (i.e., relating to a sense of taste). No known conventional system combines an e-retailing visual and/or audio interface of an automated system with sensory output mechanisms for touch, scent, and/or tastes to permit potential consumers to experience these aspects of a purchasable item.

SUMMARY OF THE INVENTION

The present invention includes a solution for providing a robust user experience with an automated system that includes sensory output, such as touch, taste, and/or smell as well as visual output and/or audio output. The automated system can be an e-commerce or automated shopping system. The method can visually present a user selected item for consumer purchase within a graphical user interface. Sensory output can be provided that simulates how the selected item smells, feels, and/or tastes. A user can then make a selection in the GUI to modify an aspect of the selected item and/or an environmental condition for an environment of the selected item. The visual presentation of the object and the sensory output for the item can be adjusted in accordance with the user specified modification.

The present invention can be implemented in accordance with numerous aspects consistent with the material presented herein. For example, one aspect of the present invention can include a method for providing a sensory enhanced remote shopping experience. The method can include a step of visually presenting a user selected one of a set of items for consumer purchase within a graphical user interface. Auditory output can optionally be provided for the shopping experience. Additionally sensory output associated with touch, smell, and/or taste can be produced for the selected item. A user can control various conditions related to the item, which results in different sensory output being generated based upon the user selected conditions.

Another aspect of the present invention can include an interface of an automated system that includes an item selector, an item display, a sensory option selector, a produce sensory output selector, and/or an item purchase option. The item selector can permit a user to select one of multiple available items. The item display can visually display an item selected via the item selector. The sensory option selection can permit a user to select one sensory output from among a set of possible outputs that include two or more of touch, scent, and taste. The produce sensory output selector can generate the selected sensory output for the selected item. The item purchase option can permit a consumer using the interface to purchase he selected item.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, any other recording medium, or can also be provided as a digitally encoded signal conveyed via a carrier wave.

The method detailed herein can also be a method performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
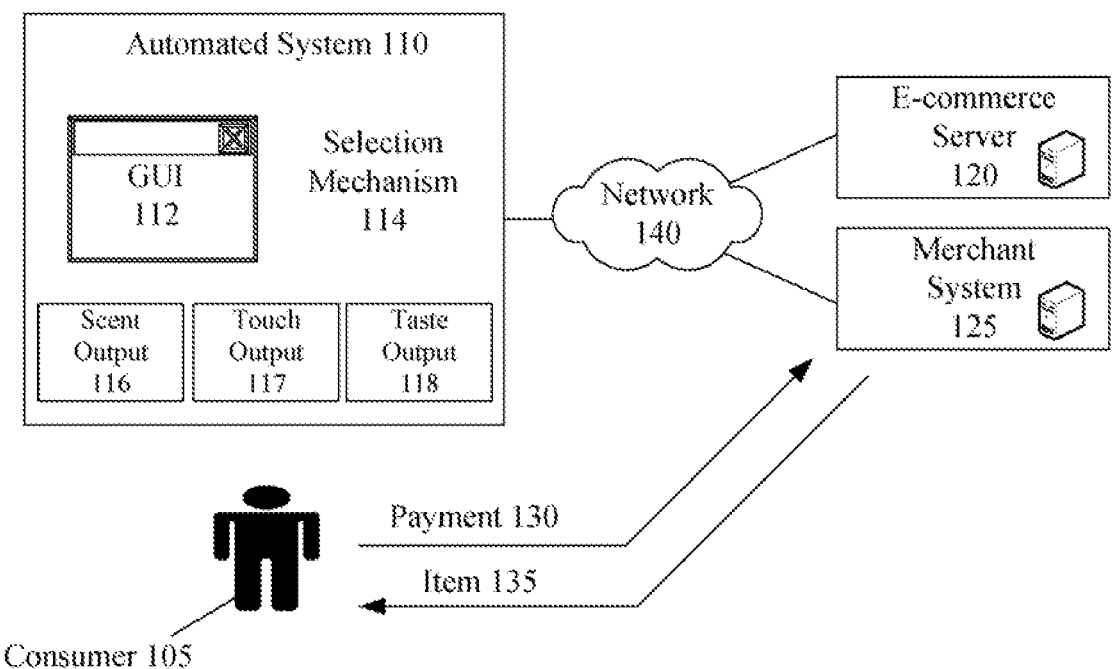
FIG. 1 is a schematic diagram of a system for implementing a retail automated system that permits consumers to experience a touch, taste, and/or smell of an item to be purchased.

FIG. 1 is a schematic diagram of a system 100 for implementing a retail automated system that permits consumers 105 to experience a touch, taste, and/or smell of an item to be purchased. The automated system 110 can be a retail kiosk, a desktop computing system, a specialized retail system, and any other computing device. Automated system 110 can include a graphical user interface (GUI) 112, a selection mechanism 114, and various components that produce scent output 116, touch output 116, and/or taste output 118.

The GUI 112 can be an interface, such as a touch screen interface, through which consumer 105 can interact with system 110. The GUI 112 can include visual and/or auditory modalities. Various retail items for purchase can be selected, via the selection mechanism 114. Each item can be associated with an item specific touch, taste, and/or scent.

The output peripherals 116-118 can be any peripherals capable of simulating a scent, touch, and/or taste of a selected product. In one embodiment, the peripherals 116-118 can be implemented using a "vending machine" concept where various samples each associated with a limited number of items can be loaded into the automated system 110. A sample can be produced upon user selection so that the user can touch, taste, and/or smell the item. For example, various samples of material can be loaded into the system 110 so that a user is able to feel material of a shirt, suit, and/or dress that is able to be purchased via the automated system 110.

In another embodiment, more advanced and generalized technologies can be used for output peripherals 116-118. The more advanced technologies can stock a plurality of foundation components that can be mixed in any of a variety of fashions to generate a desired output; much like different color pigments can be mixed to generate a desired color.

For example, scent output peripheral 116 can be a computer peripheral that includes a scent cartridge that contains a set of primary odors. Combinations of these primary odors can be mapped to items to generate characteristic smells. For instance, the ISMELL device by DigiScents, Inc. utilizes a USB based peripheral having an odor cartridge that contains 128 primary odors. In another example, peripheral 116 and peripheral 118 can be combined into a single output device that generates odorous combinations on strips of paper, which can be licked for taste. One example of such a combined device is the Sensory Enhanced Net experience (SENX) device by Trisenx, Inc.

The touch output peripherals 117 current exist to permit blind people to read Braille, to vibrate (e.g., vibrating game consoles), to resist motion (e.g., force response joysticks), and to generate other touch sensitive responses. Different materials, such as inflatable materials, can automatically adjust their firmness/hardness by inflating. Further, adding various liquids to a material can cause that material to have a slicker or rougher feel. Any and all of the technologies (as well as a vending machine solution) can be used to simulate a feel of a particular item for purchase. For example, a "master" joystick can be used to simulate the mobility, feel responsiveness, reactions, and the like of many different joysticks, which a consumer 105 can purchase via the automated system 110, which can be a joystick kiosk.

Once consumer 105 has experienced an item via system 110, the consumer can purchase the item by submitting a payment 130 to a merchant system 125. In one embodiment, the payment 130 can be entered into the automated system 110 and conveyed to an e-commerce server 120 via network 140. The e-commerce server can be associated with the automated system 110. For example, when system 110 is a kiosk, server 120 can be the kiosk backend. When system 110 is a desktop computer, server 120 can be a Web server for a sensory enhanced Web site. The e-commerce server 120 can submit orders to merchant system 125, which can be a warehousing/shipping system. The merchant system 125 can ship selected item 135 to an address chosen by customer 105.

Figure 2:
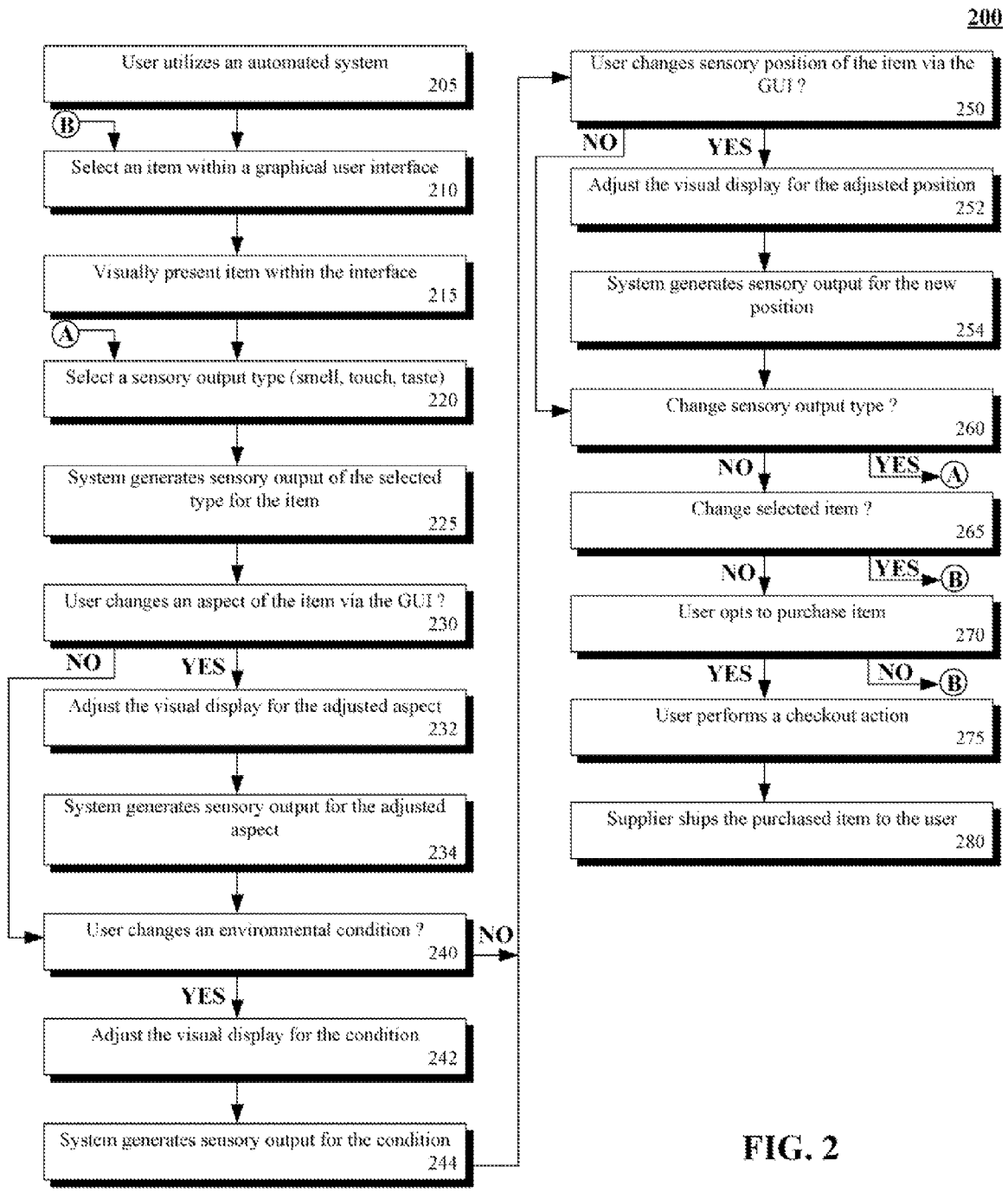
FIG. 2 is a flow chart of a method for integrating touch, taste, and/or scent with a graphical user interface when buying remotely located items using an automated system in accordance with an embodiment of the inventive arrangements disclosed herein.

FIG. 2 is a flow chart of a method 200 for integrating touch, taste, and/or scent with a graphical user interface when buying remotely located items using an automated system in accordance with an embodiment of the inventive arrangements disclosed herein. The method 200 can be performed in the context of a system 100.

The method can begin in step 205, where a user utilizes an automated system. The automated system can be a kiosk, Web based system accessed from a computing device, or any other system with a GUI and an additional sensory output attached. In step 210, an item can be selected within the graphical user interface. In step 215, the item can be visually presented within the GUI. In optional step 220, one or more sensory output types, such as smell, touch, and taste, can be selected using the GUI. When only one enhanced sensory output option is available, such as smell, step 220 is unnecessary. Further, step 220 is unnecessary in configurations where multiple sensory output options are present, such as smell and touch, that are both constantly enabled. In step 225, the automated system can generate sensory output (e.g., a configured odor, a tactile sensation, and/or an edible/lickable artifact that can be tasted) corresponding to the sense selected in step 220.

In step 230, the user can choose to change an aspect of the selected item using the GUI. The aspect can affect an aggregate composition, an item subtype, a color, a texture, and any other aspect of the item that affects how the selected item is experienced by an observer. When no aspect change is chosen, the method can skip from step 230 to step 240. When an aspect is changed, the method can progress to step 232, where the visual display can be updated for the user adjusted aspect. In step 234, a new sensory output can be provided that simulates a sensation provided by the item having the adjusted aspect. The new sensory output can be different from the output of step 225.

In step 240, the user can choose to change an environmental condition for the selected item using the GUI. The environmental condition can affect how the object is viewed or sensed in some manner. For example, a change in lighting can affect how an item is viewed. A change in temperature or background conditions can affect how an item smells. Time can be an environmental condition that affects how an item smells, feels, or tastes. When no environmental change is chosen, the method can skip from step 240 to step 250. When an environmental condition is changed, the method can progress to step 242, where the visual display can be updated for the user adjusted condition. In step 244, a new sensory output can be provided that simulates a sensation provided by the item presented within the environment having the changed condition. The new sensory output can be different from the output of step 225.

In step 250, the user can choose to change a position of the item from which a user experiences the item. The position can affect a look, feel, touch, and/or taste of the item. For example, visually zooming in and out as well as changing a perceptive angle can change a visual display of the item. An item, such as a rose, can have a different touch, smell, taste depending upon whether a user is sensing a step of the rose or the petals of the rose. Distance from an item can also affect a strength and nature of sensory output. When no position change is chosen, the method can skip from step 250 to step 260. When a position is changed, the method can progress to step 252, where the visual display can be updated for the user adjusted aspect. In step 254, a new sensory output can be provided that simulates a sensation provided by the item experienced from the adjusted position. The new sensory output can be different from the output of step 225.

In step 260, a user can opt to change the sensory output type. When changed, the method can loop to step 220, where a different one of smell, touch, and taste can be selected. In step 265, a user can choose to select a different item from the automated system. When a different item is selected, the method can proceed from step 265 to step 210, after which the new item can be visually presented and a new sensory output for the new item can be provided.

In step 270, a user can choose to purchase the selected item, which can place the item in an electronic shopping cart. In step 272, a user can choose to either continue shopping or to check out. When a user chooses to continue shopping, the method can loop to step 210, where a user can select a different item. The method otherwise proceeds to step 275, where a user can checkout items that have been previously placed in the electronic shopping cart. In step 280, purchased items can be shipped to an address specified by the user.

Figure 3:
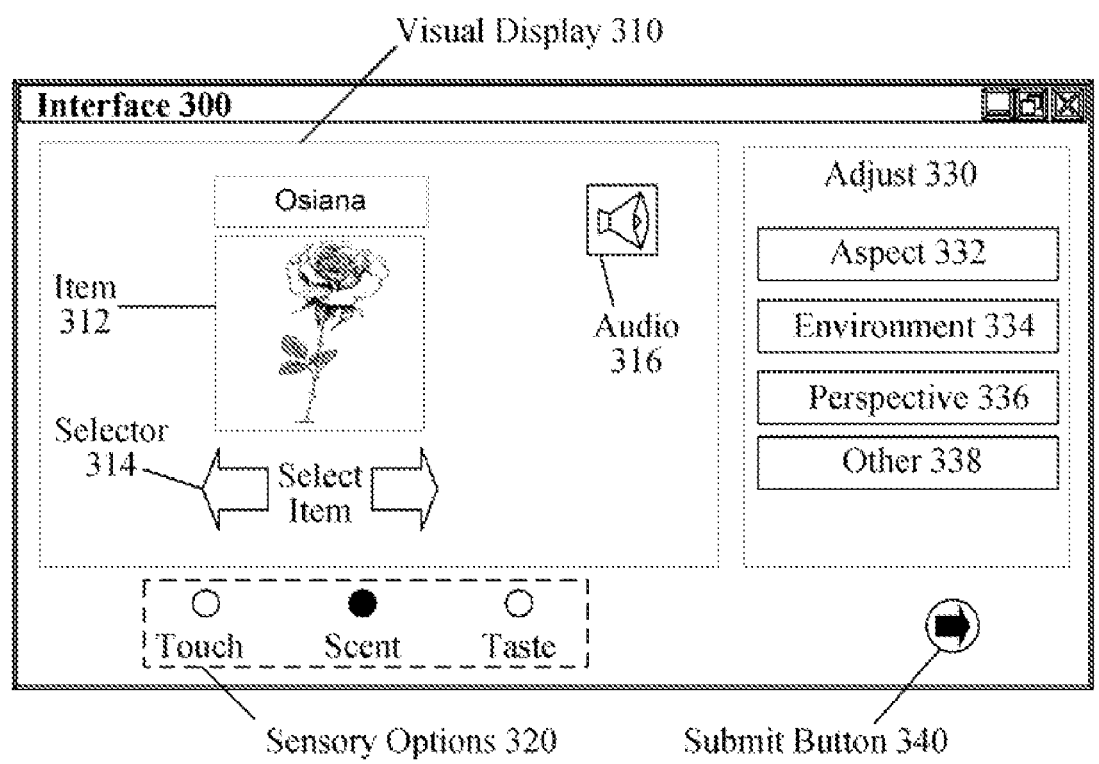
FIG. 3 is an interface that integrates senses of touch, smell, and/or taste to a visual computing interface in accordance with an embodiment of the inventive arrangements disclosed herein.

FIG. 3 is an interface 300 for that integrates senses of touch, smell, and/or taste to a visual computing interface in accordance with an embodiment of the inventive arrangements disclosed herein. Interface 300 can be utilized in the context of a system 100 and/or a method 200.

Interface 300 includes a visual display region 310, such as a GUI. One or more images of items 312 can be presented in region 310. An item selector 314 control can permit a user to select different items 312. An optional audio 316 input/output modality can be included.

One or more user selectable controls for sensory options 320 can be provided. The options 320 can include options for touch, scent, and taste. Selecting an option 320 followed by the submit button 340 results in sensory output of the selected type being provided. For example, when a touch option 320 is selected, pressing the submit button 340 can result in a tactile output related to item 312. When a scent option 320 is selected, pressing button 340 can result in a scent being presented to a user that simulates the scent of the item 312. Selection of option 320 can result in an edible/lickable object being produced that corresponds to how item 312 tastes. In one configuration (not shown) multiple sensory options 320 can be simultaneously selected.

Interface 300 can also include a set of adjustment controls 330. Controls 330 can include options to modify an aspect 332, an environment 334, a perspective 336, or other factor 338 related to item 312. Control 330 options can vary depending upon a selected item 312. The different options 332-338 can affect a visual image of item 312 and/or sensory output generated for item 312. For example, if item 312 is a cake making kit, selecting an alternative ingredient (e.g., substituting apple sauce for oil) that represents an aspect 332 change, can effect how the item 312 tastes, which in turn affects a taste of an output edible designed to simulate the taste of item 312. In another example, changing ambient smells of an environment 334 in which a perfume (item 312) is worn from a crowded indoor environment (e.g., an elevator) to an outdoor environment (e.g., a beach) can change the scent produced for item 312.

Figure 4:
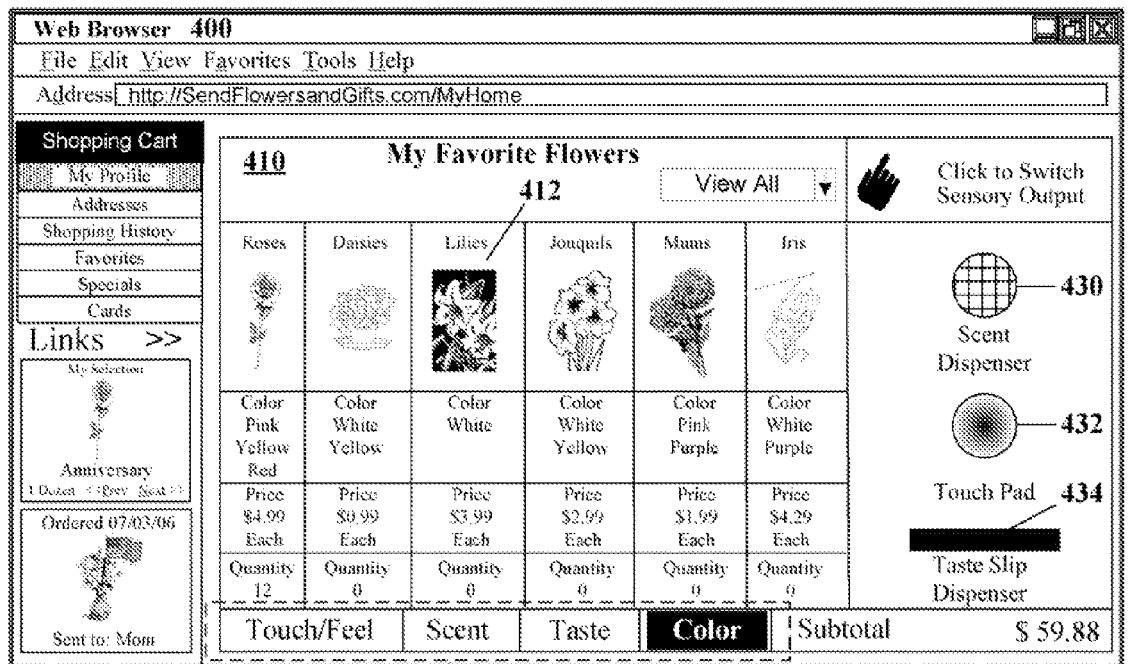
FIG. 4 is an interface illustrating a Web site that is enhanced for scent, touch, and taste in accordance with an embodiment of the inventive arrangements disclosed herein.

FIG. 4 is an interface 400 illustrating a Web site that is enhanced for scent, touch, and taste in accordance with an embodiment of the inventive arrangements disclosed herein. Interface 400 can be utilized in the context of a system 100 and/or a method 200.

Interface 400 can include an item selection 410 section, where a user can select any of a set of visually presented items. As shown, a user can select from among many different types of flowers, such as roses, daisies, lilies, jonquils, mums, and irises. Each flow type can specify available colors, price, and quantity desired. Further, a set of user selectable adjustment controls 420 can be provided for adjusting various configurable settings. For example, a user can increase/decrease a strength of a generated scent using the scent adjustment 420.

Once an item is elected, a user can click on a sensory output control 430-434. For example, if a user selects lilies 412 in section 410 then clicking the scent dispenser 420 will cause a scent of lilies to be produced. Clicking on the touch pad 432 can cause a tactile pad to simulate a feel of the lily petals and/or stem. Clicking on the taste slip dispenser 434 can eject a taste slip that taste like a lily.

Different one of the control 430-434 can be dynamically enabled/disabled based upon the selected item. For example, the taste option 434 can be disabled generally for all the flowers in one configuration. In a different configuration, however, a user may have pets and/or young children who may attempt to taste each flower, even if flowers generally are not intended to be eaten. Assuming taste of a flower is a potential concern for a prospective consumer, the taste slip dispenser option 434 can be selectively enabled for non-toxic flowers.

Figure 5:
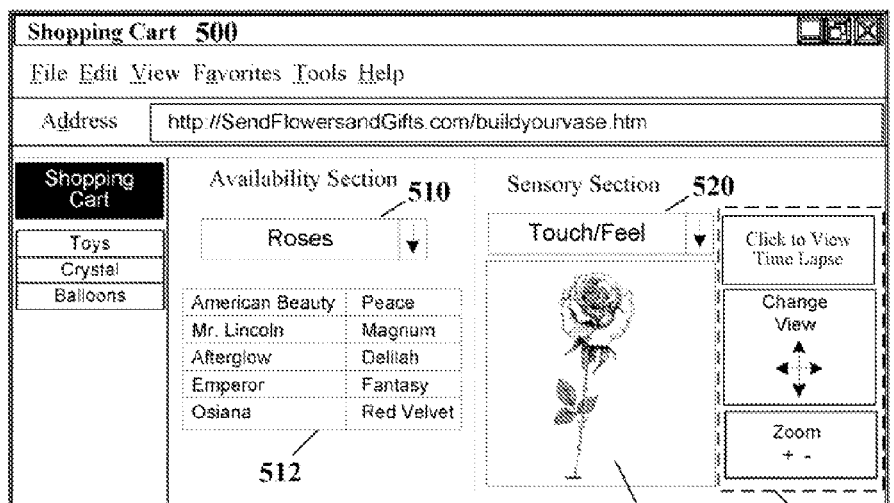
FIG. 5 is an interface having sensory controls for touch, taste, and/or smell in accordance with an embodiment of the inventive arrangements disclosed herein.

FIG. 5 is an interface 500 having sensory controls for touch, taste, and/or smell in accordance with an embodiment of the inventive arrangements disclosed herein. Interface 500 can be utilized in the context of a system 100 and/or a method 200. Further, interface 500 can represent a shopping cart screen associated with interface 400.

In interface 500, an item selection control 510 can be provided, which is associated with a set of sub options 512. As shown, a rose can be selected in control 510, which causes different types of roses to appear in section 512. A user can select one of the subtypes in section 512, which causes that type of rose to visually appear in display 525. A user can select a sensory option using control 520, such as touch, smell, and taste. A sensory output for the selected subtype 512 of rose (e.g., a scent of an Osiana) can be generated in accordance with user selections. A set of adjustment controls 530 can also be included in the interface 500.

Figure 6:
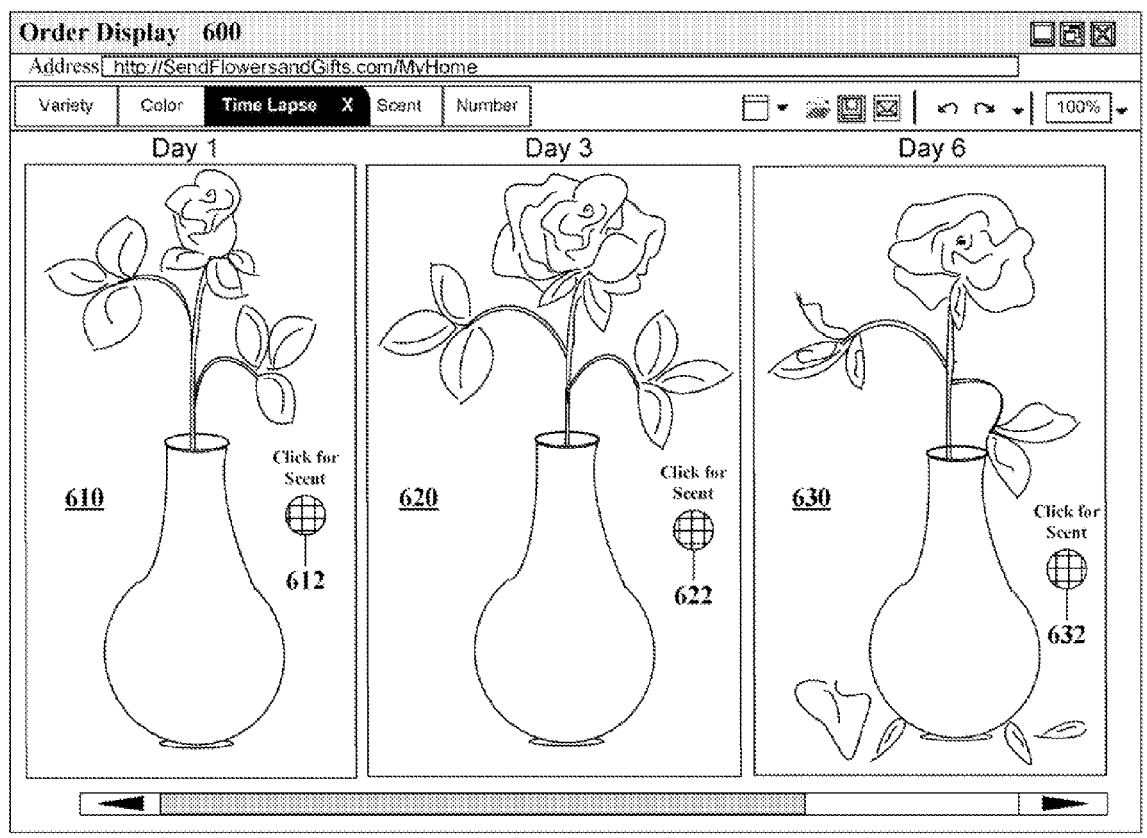
FIG. 6 is an interface having sensory controls for touch, taste, and/or smell and having a time adjustment in accordance with an embodiment of the inventive arrangements disclosed herein.

FIG. 6 is an interface 600 having sensory controls for touch, taste, and/or smell and having a time adjustment in accordance with an embodiment of the inventive arrangements disclosed herein. Interface 600 can be utilized in the context of a system 100 and/or a method 200. Further, interface 600 can represent time adjustment screen for interfaces 400 and/or 500.

In interface 600, three different time snapshots 610, 620, and 630 are provided for the same item, which in this case is a rose. Each snapshot 610, 620, and/or 630 can have a corresponding sensory output switch 612, 622, and/or 632. Different scents can be delivered depending upon which time snapshot 610, 620, and 630 is selected. For example, the rose can have one smell on day one, a different smell on day three, and yet another smell on day six.

The different time snapshots 610, 620, and 630 can be set for user configurable times. Also, time lapse playback that includes visual and additional sensory output can be included in interface 610.

Figure 7:
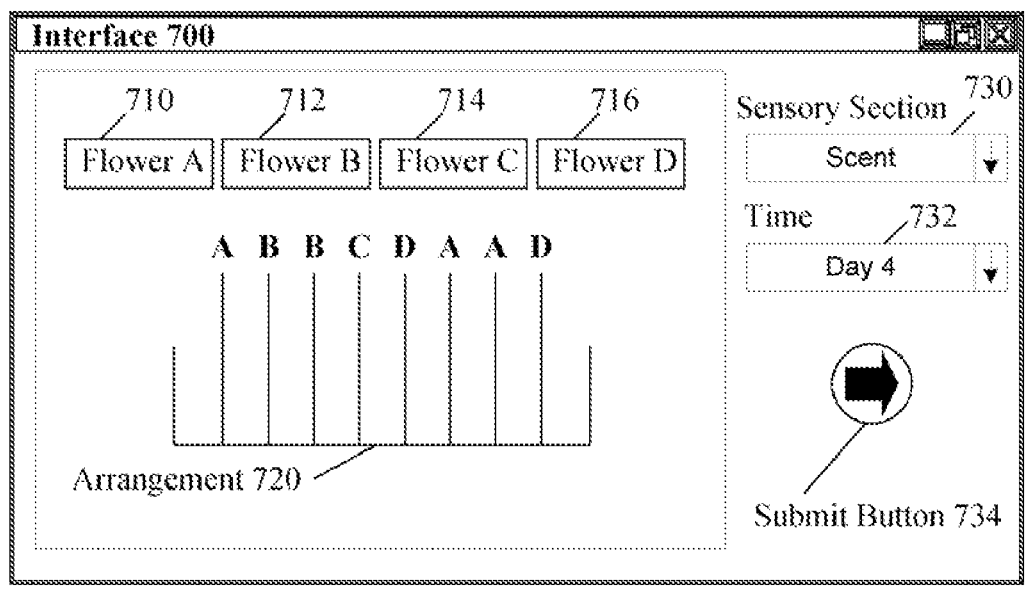
FIG. 7 is an interface for an aggregate item having user configurable component parts, where the interface provides visual output as well as sensory output for touch, taste, and/or smell.

FIG. 7 is an interface 700 for an aggregate item having user configurable component parts, where the interface 700 provides visual output as well as sensory output for touch, taste, and/or smell. Interface 700 can be utilized in the context of a system 100 and/or a method 200.

System 700 can include an aggregate item 720 consisting of numerous component parts 710-716. For example, the aggregate item 720 can be a flower arrangement that includes multiple flowers 710-716. A user can select which flowers 710-716 are to be included in the arrangement 720. A sensory selector 730 can be used to provide a sensory output for the arrangement 720. For example, a user can opt to have a smell of the arrangement 720 provided. One or more adjustment options 732 can also be provided. For example, a user can select a time option 732, such as day four, and receive a visual and/or sensory output for the arrangement 720 at the specified time. Once a user has approved the exact specifications of the item via interface 700, the user can select the arrangement 720 by pressing or selecting the submit button 734 to indicate approval of the arrangement.

Figure 8:
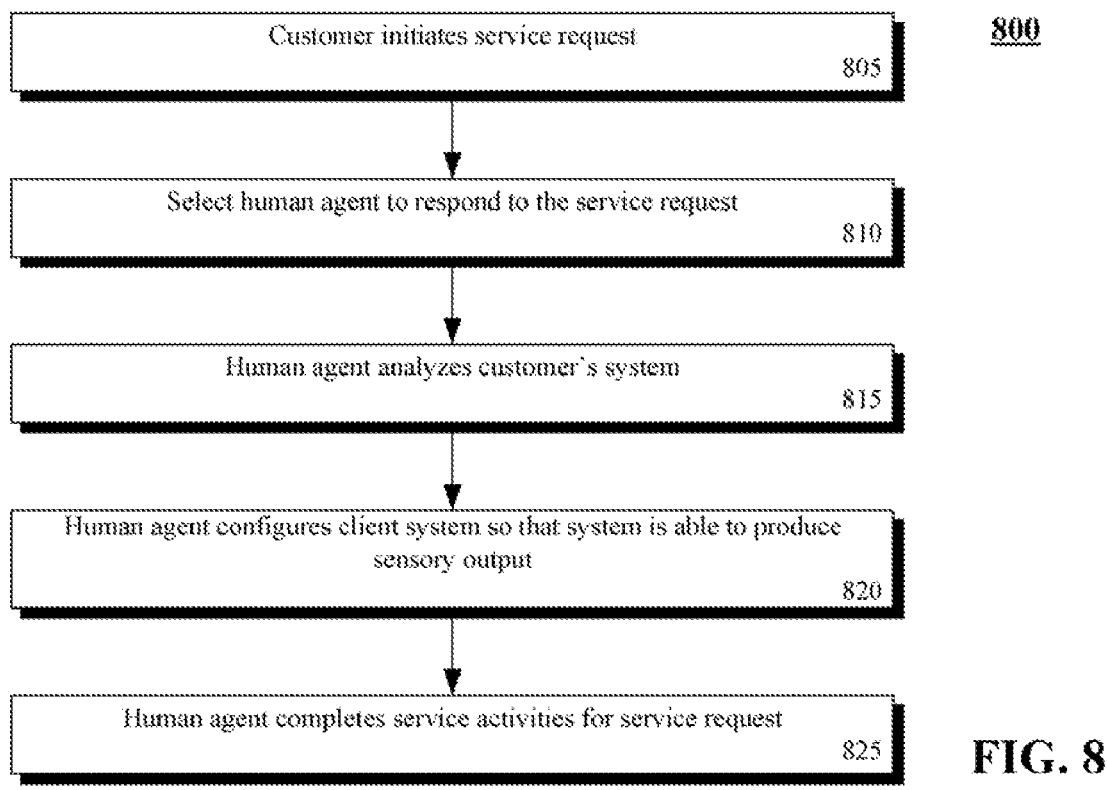
FIG. 8 is a flow chart of a method where a service agent can configure an automated system that permits a user to touch, taste, and/or smell in accordance with an embodiment of the inventive arrangements disclosed herein.

FIG. 8 is a flow chart of a method 800 where a service agent can configure an automated system that permits a user to touch, taste, and/or scent in accordance with an embodiment of the inventive arrangements disclosed herein. Method 800 can be performed in the context of system 100.

Method 800 can begin in step 805, when a customer initiates a service request. The service request can set-up or troubleshoot an automated system, such as a kiosk, that permits a user to purchase an item. Touch, taste, and scent output can be generated by the automated system. The service request can also be a request to train personnel to use or install or update software for the system. In step 810, a human agent can be selected to respond to the service request. In step 815, the human agent can analyze a customer's current system and information needs and can develop a solution. In step 820, the agent can implement the solution. For example, the human agent can create an e-commerce Web site, which permits users having sensory output peripherals attached to their computers to experience touch, smell, and/or taste of available items. In step 825, the human agent can complete service activities for the service request.

It should be noted that while the human agent may physically travel to a location local to adjust the customer's computer or application server, physical travel may be unnecessary. For example, the human agent can use a remote software agent to remotely manipulate the customer's computer system and/or to remotely conduct training sessions.

The present invention may be realized in hardware, software, or a combination of hardware and software. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

What is claimed is:

1. A method for providing a sensory enhanced remote shopping experience comprising:
   visually presenting a user selected one of a plurality of items for consumer purchase within a graphical user interface;
   providing sensory output associated with at least one sense for the selected item, said sense comprising at least one sense selected from a group of senses consisting of touch, smell, and taste, wherein the sensory output simulates a sensory characteristic of the selected item, wherein the sensory output varies for the plurality of items;
   displaying a user selectable graphical user interface control for selecting at least one environmental condition, said at least one environmental condition including at least one of temperature and lighting; and
   adjusting the graphical user interface and the sensory output in accordance with the user selected environmental condition.

2. The method of claim 1, wherein the at least one sense comprises at least two senses selected from the group of senses.

3. The method of claim 2, further comprising:
   displaying a user selectable graphical user interface control for selecting one of the at least two senses; and
   providing sensory output for the selected object for the user selected one of the senses.

4. The method of claim 2, wherein the at least one sense comprises at least three senses selected from the group of senses.

5. The method of claim 1, wherein a sensory characteristic of the selected item varies over time, said method further comprising:
   permitting a user to select a time; and
   producing a second sensory output associated with the sense for the selected item that is different from an original output of the providing step, wherein said second sensory output simulates a sensory characteristic of the selected item at the user selected time.

6. The method of claim 5, wherein the at least one sense is scent.

7. The method of claim 1, wherein the sensory characteristic of the selected item varies depending upon a point of the item from which the sense was experienced, said method further comprising:

displaying a user selectable graphical user interface control for selecting a point of the selected item; and producing a second sensory output associated with the sense for the selected object that is different from an original output of the providing step, wherein said sensory output simulates the sensory characteristic of the selected item at the selected point.

8. The method of claim 1, further comprising:
displaying a user selectable graphical user interface control to modify an aspect of the selected item;
adjusting the visual presentation of the selected object within the graphical user interface in accordance with the user modification; and
producing a second sensory output associated with the sense for the selected item that is different from an original output of the providing step, wherein the second sensory output simulates a sensory characteristic of the selected item having the user selected aspect modification.

9. The method of claim 1, further comprising:
presenting an item purchase option in the graphical user interface configured to permit a consumer using the graphical user interface to purchase the selected item.

10. The method of claim 1, wherein the selected item is an aggregate formed from a plurality of distinct component parts, and wherein the sensory characteristic of the selected item varies depending upon the component parts that form the aggregate, said method further comprising:
displaying a user selectable graphical user interface control for selecting component parts for the aggregate; and
producing a second sensory output associated with the sense for the selected object that is different from an original output of the providing step, wherein said sensory output simulates the sensory characteristic of the selected item having the user selected component parts.

11. The method of claim 1, wherein the presenting and the providing steps are performed by an automated system responsive to a set of programmatic instructions stored within a memory of the automated system.

12. The method of claim 1, wherein the GUI is an interface of a self-service kiosk, said kiosk providing the sensory output.

13. The method of claim 1, further comprising:
accessing a Web site, said Web site including a set of programmatic instructions which controls visual output to the graphical user interface and that controls the sensory output of the providing step.

14. The method of claim 13, wherein the graphical user interface is an interface of a computing system having at least one attached sensory outputting peripheral device, said peripheral device providing the sensory output.

15. The method of claim 14, wherein the at least one sense comprises at least two senses selected from the group of senses, said method further comprising:
providing a user selectable graphical user interface control for selecting one of the at least two senses; and
producing sensory output for the selected object for the user selected one of the senses.

16. The method of claim 1, wherein said steps of claim 1 are steps performed by at least one machine in accordance with at least one computer program stored within a machine readable memory, said computer program having a plurality of code sections that are executable by the at least one machine.

17. The method of claim 1, wherein the steps of claim 1 are performed by at least one of a service agent and a computing device manipulated by the service agent, the steps being performed in response to a service request.

18. A method for experiencing remotely located items from an automated system comprising:
visually presenting a user selected item within a graphical user interface;
producing sensory output simulating how the selected item will appear when physically present, said sensory output comprising at least one of smell, touch, and taste;
receiving a user selection within the graphical user interface that modifies at least one of an aspect of the selected item and an environmental condition for the selected item;
adjusting the visual presentation of the user selected item and the sensory output in accordance with the user selection, wherein the adjusted sensory output is different than an originally provided sensory output
displaying a user selectable graphical user interface control for selecting at least one environmental condition, said at least one environmental condition including at least one of temperature and lighting; and
adjusting the graphical user interface and the sensory output in accordance with the user selected environmental condition.

19. An interface of an automated system comprising:
an item selector configured to permit a user to select one of a plurality of items;
an item display configured to visually display an item selected via the item selector;
a sensory option selector configured to permit a user to select one sensory output from among a set of possible outputs, said set including at least two of touch, scent, and taste;
a produce sensory output selector configured to generate the selected sensory output for the selected item;
an item purchase option configured to permit a consumer using the interface to purchase the selected item; and
an environmental control selector for selecting at least one environmental condition, said at least one environmental condition including at least one of temperature and lighting, wherein the sensory output is adjusted in accordance with the user-selected environmental condition.

20. The interface of claim 18, further comprising:
at least one user selectable adjustment control configured to permit a user to modify an aspect of the selected item, an environmental condition of the selected item, and a point of experience for the selected item, wherein changes made through the adjustment control results in corresponding change in output generated responsive to selecting the produce sensory output selector.

* * * * *